United States Patent
Andrews et al.

(10) Patent No.: US 7,031,435 B2
(45) Date of Patent: Apr. 18, 2006

(54) METHOD AND APPARATUS FOR SIMULTANEOUS LINE-INTERFACE WIRING COLLISION DETECTION

(75) Inventors: Jeff Andrews, Norcross, GA (US); Richard Padula, Suwanee, GA (US)

(73) Assignee: Arris International, Inc., Suwanee, GA (US)

( * ) Notice: Subject to any disclaimer, the term of this patent is extended or adjusted under 35 U.S.C. 154(b) by 400 days.

(21) Appl. No.: 10/462,556

(22) Filed: Jun. 16, 2003

(65) Prior Publication Data

US 2004/0046674 A1    Mar. 11, 2004

Related U.S. Application Data

(60) Provisional application No. 60/388,866, filed on Jun. 14, 2002.

(51) Int. Cl.
*H04M 1/24* (2006.01)
*H04M 3/08* (2006.01)
*H04M 3/22* (2006.01)

(52) U.S. Cl. ............... 379/1.01; 379/1.04; 379/2; 379/29.04

(58) Field of Classification Search ........... 379/399.01, 379/413.02, 413.01, 401, 412, 413, 1.01, 379/1.04, 2, 29.03, 29.04, 29.1, 32.01, 32.02, 379/32.04, 322, 324
See application file for complete search history.

(56) References Cited

U.S. PATENT DOCUMENTS

| | | | | |
|---|---|---|---|---|
| 5,390,231 | A | * | 2/1995 | Hung et al. .................... 379/2 |
| 5,802,151 | A | * | 9/1998 | Bevill et al. ............. 379/93.05 |
| 6,160,884 | A | * | 12/2000 | Davis .................... 379/373.01 |
| 6,169,785 | B1 | * | 1/2001 | Okazaki .................. 379/27.01 |
| 6,356,624 | B1 | * | 3/2002 | Apfel et al. ............. 379/27.01 |
| 6,618,469 | B1 | * | 9/2003 | Wang et al. ............... 379/1.01 |
| 6,778,664 | B1 | * | 8/2004 | Price et al. ................. 379/412 |
| 6,856,672 | B1 | * | 2/2005 | Dunlap .................... 379/26.02 |
| 6,870,902 | B1 | * | 3/2005 | Angliss et al. ........... 379/27.06 |
| 6,870,903 | B1 | * | 3/2005 | Angliss et al. ........... 379/27.06 |

\* cited by examiner

*Primary Examiner*—Binh K. Tieu
(74) *Attorney, Agent, or Firm*—John L. Doughty

(57) ABSTRACT

A method uses circuitry in a data interface that provides telephony service over a high-speed network to detect the presence of a secondary source of VBH battery voltage on a tip-ring system. If a detected source other than the data interface is impressing battery voltage on the tip-ring system, the circuitry disconnects the data interface's battery source and produces a message that another source is VBH. The determination that another source is present may be based on a threshold value to account for noise.

The message is used to produce an alarm at a user interface device. The alarm may be a light indication mounted on the data interface. The alarm may also be a web page that is retrieved from a memory device and displayed on a PC, a PDA or the data interface. The alarm may be provided locally and remotely to a provider's server.

7 Claims, 3 Drawing Sheets

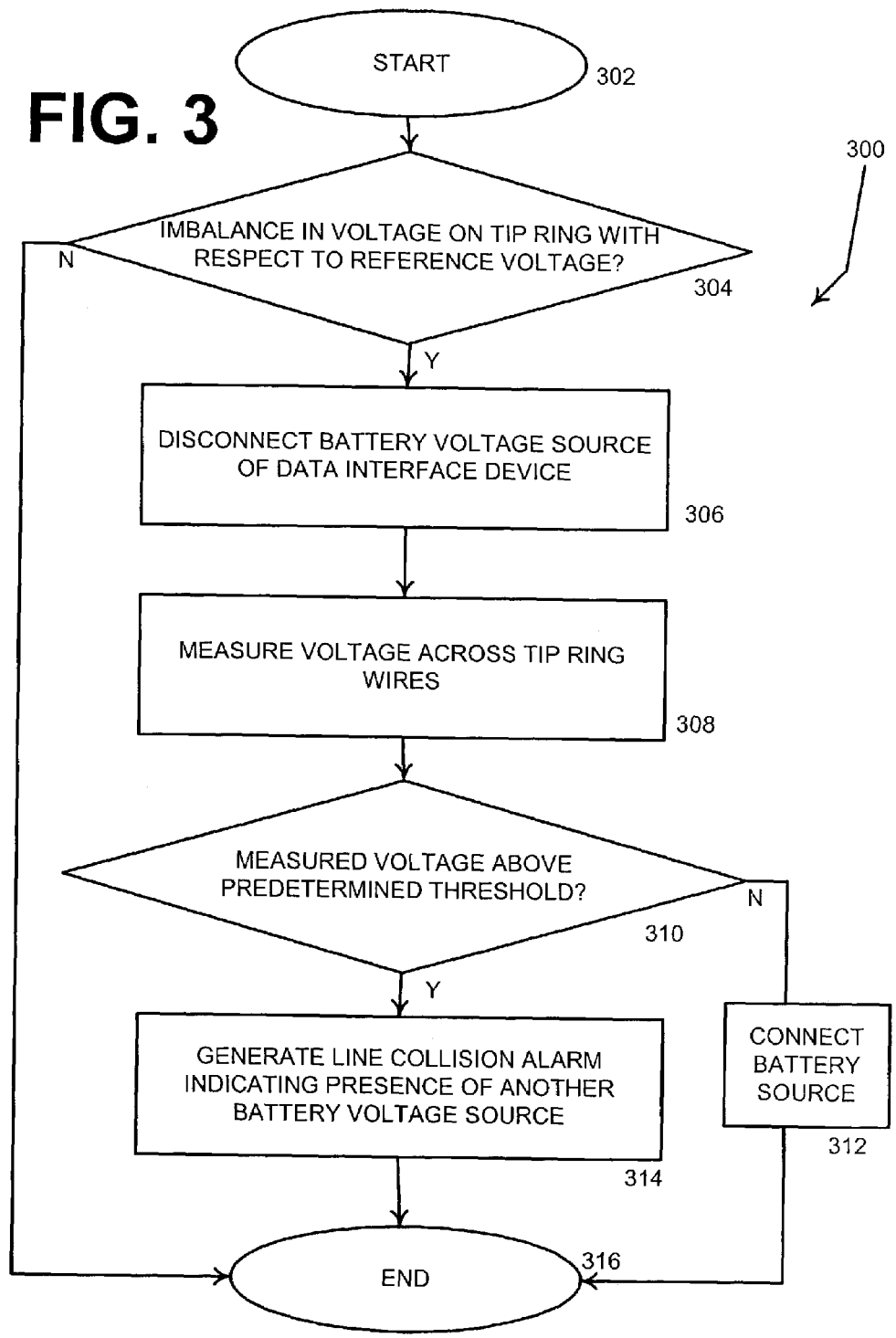

METHOD AND APPARATUS FOR SIMULTANEOUS LINE-INTERFACE WIRING COLLISION DETECTION

CROSS REFERENCE TO RELATED APPLICATION

This application claims the benefit of priority under 35 U.S.C. 119(e) to the filing date of Andrews, et al., U.S. provisional patent application No. 60/388,866 entitled "Method and Apparatus for Simultaneous Line-interface Wiring Collision Detection", which was filed Jun. 14, 2002, and is incorporated herein by reference in its entirety.

FIELD OF THE INVENTION

The present invention generally relates to providing telephony over Internet protocol, and, more particularly to facilitating the notification that more than one source of voltage is being applied to a single telephony twisted pair of conductors within a home.

BACKGROUND

As the use of digital data for transporting communications signals continues to grow in the consumer sector, more and more homes and offices are beginning to receive telephony services using an Internet connection. Furthermore, the physical network that transports the data may comprise a community antenna television ("CATV") coaxial cable ("coax") network, or other high-speed network, including digital subscriber line ("DSL"). In such a scenario, a drop from a service provider's outdoor coaxial cable plant connects to subscriber premise equipment ("SPE"), which is sometimes located outside a home or small office, or inside the premises. Within the SPE, television video signals and data signals, such as for example, Internet signals, are broken out and routed to their corresponding equipment. A cable modem is an example of an SPE with a coaxial cable connection for interfacing with a CATV network and typically an Ethernet or USB connection for providing the data signal. To the cable modem, a multimedia terminal adaptor ("MTA") is typically connected if a customer receives telephony services via the data signal. In addition, some manufacturers house the cable modem and MTA as a single device, for example, a Touchstone™ Telephony Modem product ("TTM"), as offered by ARRIS International, Inc.

A TTM provides a user with telephony services over an Internet data network, namely, a cable modem termination system ("CMTS") network. Cable telephony generally, the technology of which is known in the art, provides a subscriber with telephony service that is transparent as to the source of the service. In other words, a user plugs a telephone into a TTM and, in addition to basic telephony connectivity, can access a set of features such as, for example, dial tone, call waiting and other features similar to those provided by a traditional plain old telephone system ("POTS").

When a TTM is installed in a consumers home or office, either by the consumer or by an installer working for a service provider, the TTM may be connected to the incoming CATV coax and then an output telephony wire from the TTM may be plugged in to a telephone wall jack, such as, for example, an RJ-11 jack. When the output telephone wire from the TTM is connected to the wall jack, service available on the wire is available to all of a plurality of telephone jacks in the home or office, as the plurality of wall jacks that provide service to a given customer are typically all connected in parallel. The output of the TTM typically provides a battery line voltage signal that is similar to the battery voltage provided on a traditional POTS line, as known in the art. Thus, a subscriber line interface circuit ("SLIC"), which is known in the art, inside the TTM converts incoming digital data and outputs it as an analog signal that mimics the signal provided by a POTS line card, including the battery voltage signal. Accordingly, the signals applied to all the plurality of telephone jacks connected in parallel appear to be traditional POTS, signals.

However, if an existing telephony service connection is not disconnected before the TTM is connected to the plurality of telephone jacks, damage may occur to the SLIC as well as the existing telephone company's line card, because the line card and the SLIC are both producing a battery voltage on the tip-ring twisted pair of wires inside the house or office. The nominal battery voltage for POTS systems is 48V DC, however, the actual battery voltage may range from between 42 V to 56 V. Accordingly, if either the SLIC or the line card are not outputting battery voltage at exactly the same voltage, or they are not both connected to the same ground reference potential, then the battery supply voltage of one may try to regulate itself based on the other's battery voltage. Thus, battery voltage supply of the lower voltage may draw high current in attempting to raise the battery voltage on the line to the other voltage, or at least the voltage at which it is designed to operate.

Although SLICs and line cards may typically use overcurrent protection devices, such as timed relays, to prevent circuit damage, service may be interrupted which a relay switch is open, and eventually, as the protection device cycles through repeated on-off cycles while the battery voltage differs from its design voltage, the protection device itself may be destroyed. While a user may be aware that their telephone is not working, or their newly purchased TTM is making strange noises and is getting warm, they may not know the cause of this irregular operation.

Thus, there is a need in the art for a method and system that detects when more than one battery voltage is being supplied to a telephone wire network within a house or office, and provides an alarm to alert a user or installer so that appropriate measures, such as for example, disconnecting the internal wiring of the house from the telephone company's wiring network, can be performed.

SUMMARY

If traditional POTS telephone service has not been disconnected from a user's internal wiring system, either home or office, for example, when a TTM or similar device is energized and connected to the same internal wiring system, circuitry in the TTM can be used to detect the presence of said POTS service and TO control the connection of the TTM to the wiring system. Software, firmware, and/or hardware may be used to detect POTS service, by sensing whether there is a difference in potential between the tip and ring conductors of the wiring system. If a difference is detected that is the same as the battery supply voltage being supplied by the TTM, with respect to magnitude and polarity, then it is presumed that the voltage detected is due only to the TTM battery supply. However, if the difference detected falls outside a predetermined range, battery voltage being supplied by the TTM, or similar device, is removed from the internal wiring tip-ring system.

After the battery supply voltage of the TTM is removed, the potential between the tip and the ring conductor is measured to determine whether there is still potential between the two. If there is, and the difference is greater than a predetermined threshold, an alarm message is generated to facilitate providing an indication that there may be an additional source of battery voltage currently connected to the tip ring wiring system, other than the TTM, or similar device.

The indication may be provided as an LED incorporated into the TTM housing. Alternatively, a web page may be displayed on a PC, PDA, or similar device, the web page being stored in a memory device within the TMT or in a memory device at a service provider's central location. Thus, a user, who may be a consumer, or personnel installing the TTM device and related hardware and software for a service provider, is aided in determining the cause of poor performance or lack of operation of a TTM device. A TTM may be configured to disconnect itself, at least with respect to providing battery voltage, if another competing/colliding source of battery voltage is detected on the same tip ring pair system to which it is connected. This automatic disconnecting of itself from the tip ring system is protective, to prevent damage of battery supply circuitry components that could draw too much current in attempting to stabilize the tip ring battery voltage. Accordingly, an indication of the presence of traditional POTS service aids in the determining of why a TTM device may not be working when installed in an existing tip ring system that has had its telephony service provided by traditional POTS service.

BRIEF DESCRIPTION OF THE DRAWINGS

FIG. 3 illustrates a flow diagram for providing an alarm when more than one device is providing battery voltage to telephony wiring network.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
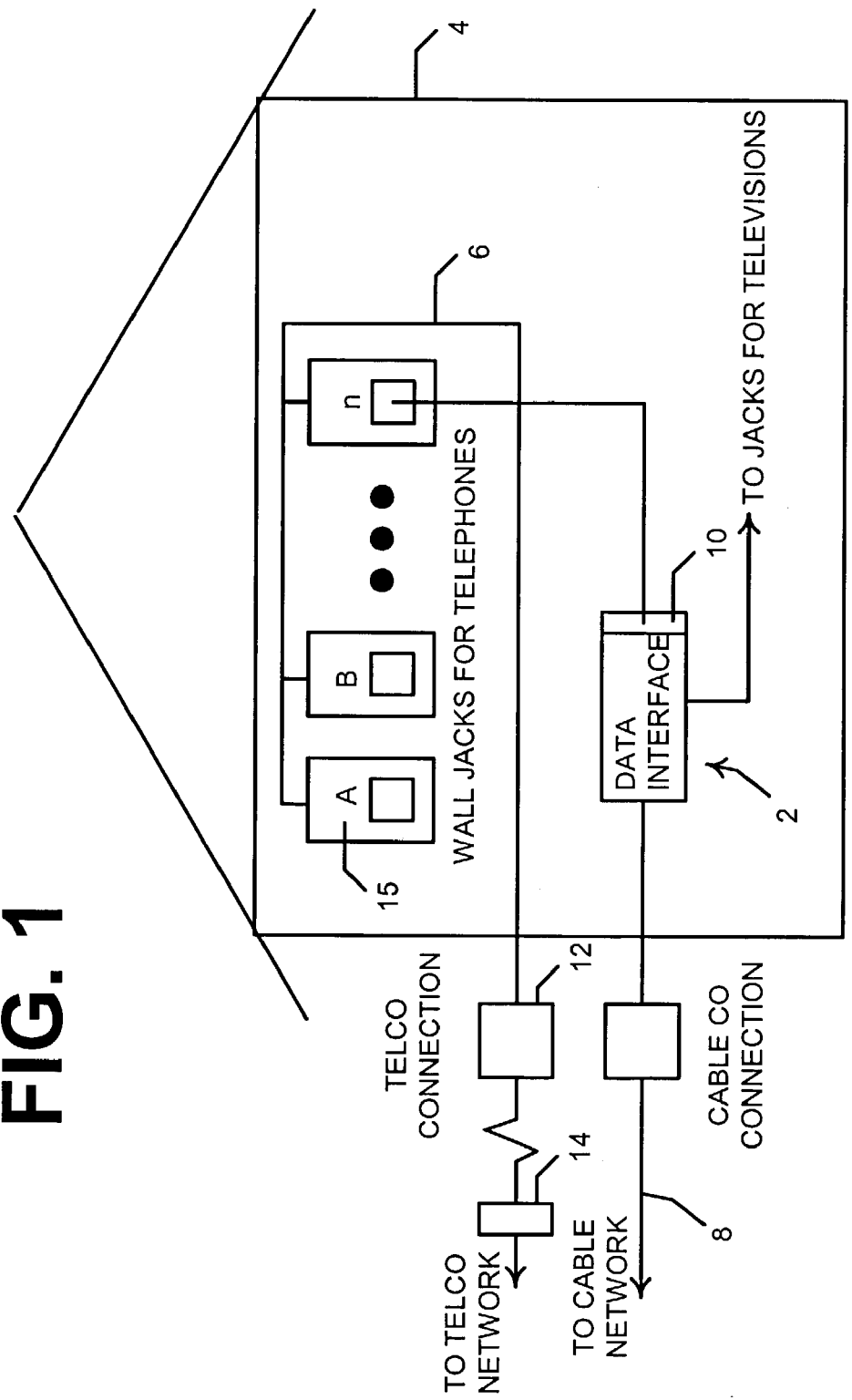
FIG. 1 illustrates an installation scenario where a data interface provides telephony service to a household telephone wiring network.

Turning now to the figures, FIG. 1 illustrates a scenario where a data interface device is used in house 4 for providing telephony service to telephone wiring network 6 in the house. Data device 2 may be, for example, a TTM or similar device for transmitting data signals over a network 8, such as, for example, a cable television coaxial cable network. Network 8 is represented in the figure as a single line for clarity, but it will be appreciated that network 8 comprises many components, including nodes, amplifiers, optical fiber between a user's data interface device 2 and a CMTS located at a service provider's head end. Data interface 2 also typically includes a subscriber line interface circuit ("SLIC") 10, which receives digital data and converts it into a format similar to the format used in a POTS system.

Included in this format is a nominally 48 volt DC battery signal that provides a power supply signal for causing the telephone to ring upon receiving an incoming call signal. Such a VBH battery voltage signal is known in the art. The battery voltage is typically provided with a standard polarity orientation with respect to the tip and ring conductors of twisted pair telephony system 6, which is known in the art. The battery voltage is typically present on the twisted pair when network 6 is connected to a telephone company's network through telco connection 12, which typically provides the demarcation point between a user's network 6 inside their home or office and the telco line card 14, which produces the battery voltage in a traditional POTS system.

In a traditional POTS system, the house-side of telco connection 12 connects at least one, typically wall-mounted, telephone jack 15 A-n, for providing user connectivity to the linecard 14. Thus, the battery voltage provided from linecard 14 is present at jacks 15 A-n whenever the linecard is active and when teleco connection 12 connects network 6 to the linecard. If a user/subscriber of telephony services decides to switch from telephony service provided by a telco to telephony service provided by a different type of provider, a cable television system operator, for example, that also provides data network services via a CATV network, connection to the CATV network is provided with data device 2 as discussed above. If the user purchases a data device 2, such as, for example, a TTM having SLIC 10, the SLIC will also be applying battery voltage as described above. When the output of SLIC 10 is connected to any one of the plurality of jacks 15 A-n, the battery voltage as applied by the SLIC will be applied at all of the jacks. Therefore, if the connection of network 6 to linecard 14 is not broken at telco connection 12 before data interface 2 is connected to network 6, then both the linecard and data device 2 will be applying a battery voltage to network 6 simultaneously. This is undesirable because components of either linecard 6 or SLIC 10 could be damaged by increased current draw as their respective power supply circuits attempt to maintain a predetermined battery voltage.

As mentioned above, the battery voltage is typically nominally 48 V, but since the ground reference of either the linecard 14 or SLIC 10 may not be the same, or either or both devices may deviate from the nominal voltage, there will usually be a difference in the voltage being applied by one device with respect to the other. In addition, the polarity of the battery voltage being applied by one may be reversed with respect to the other.

Figure 2:
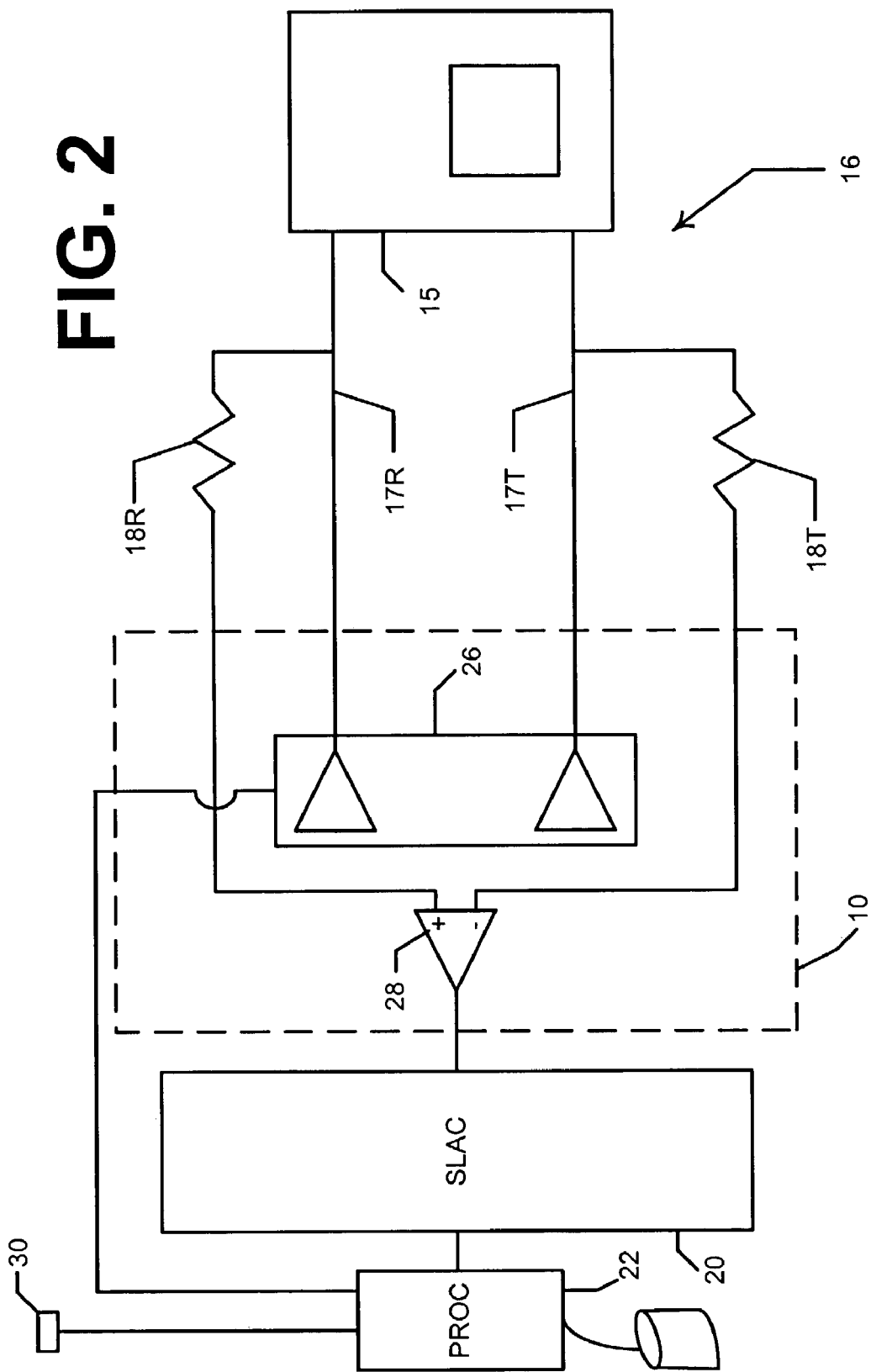
FIG. 2 illustrates a schematic of a circuit for providing an alarm when more than one device is providing battery voltage to telephony wiring network.

To provide indication that there are two 'competing', or 'colliding', battery voltage sources being applied to network 6, as just described, circuit 16, the schematic of which is illustrated in FIG. 2 may be used. Circuit 16 includes sense resistors 18T and 18R, corresponding to the tip and ring conductors 17T and 17R respectively, connected to jack 6. Circuit 16 also includes SLIC 10, subscriber line audio circuit ("SLAC") 20, which provides call line processing, and processor 22. SLIC 10, SLAC 20 and processor 22 may comprise discrete components. The components of SLIC are typically parts of a single integrated circuit ("IC"). SLIC 10 is shown as a dashed line for clarity to indicate that the components may or may not be part of a single IC.

SLIC 10 includes a power amplifier section 26 that produces the tip-ring battery voltage. Sense resistors 18 provide an electrical path between the tip-ring conductors 17 and differential amplifier 28, the path bypassing power amplifier 26. Differential amplifier 28 is used to detect voltage deviations from the nominal battery voltage, excessively high voltages, reverse polarity, and other signal anomalies. If an anomaly is detected, SLAC 20 produces an anomaly message, which is then sent to processor 22. Processor 22 may then send a disconnect signal to power amplifier 26, instructing it to turn off so that battery voltage is not impressed on the tip-ring pair 17 by SLIC 10.

However, even though the battery voltage source has been disconnected, the sense resistors allow the tip-ring voltages to still be measured. If a voltage is still sensed through resistors 18, then SLAC 20 continues to produce an indication that voltage is present and processor 22 can determine that there is another source of battery voltage on the tip-ring conductors 17 because power amplifier 26 is turned off. If processor determines that there is another source of battery voltage, a signal is produced at output port 30 for connection to an external device or system.

For example, a digital signal could be produced at port 30 for connection to a personal computer ("PC"). The message could merely be a normal/not-normal signal and the PC could use that information in accordance with a software algorithm that is part of a customized diagnostics application. The digital message provided at output port 30 could also be an HTML, or similar, web page stored in memory 32. Alternatively, the signal present at output port 30 when an anomalous condition is present on the tip ring pair 17 could merely be a signal for driving an LED, or array thereof. Thus, the LED could be mounted on a housing of a TTM and clearly provide visual confirmation of the voltage state of the tip-ring pair 17. The signal could also be a trap message sent to a service provider's head end facility using simple network management protocol ("SNMP") known in the art.

Regardless of the interface means used for providing the voltage state information, a user or an installer, or even a automated device at a service provider's head end location, can be apprised that there is another battery voltage source in addition to the TTM applying battery voltage to the tip-ring pair 17. Accordingly, said user or installer can use this information to quickly diagnose a problem and determine that the connection between the tip ring pair network system 6 and the telephone company's line card 14 needs to be disconnected at telco connection 12.

Turning now to FIG. 3, a method 300 is shown for providing an alarm that voltage anomalies exist on a tip-ring pair network, typically within a telephony circuit related to a single telephone number. After starting at step 302, a query is made at step 304 to determine whether a voltage imbalance exists with the tip ring network. For example, if a voltage difference between the tip and the ring is greater than a predetermined amount, the condition is satisfied. Also satisfying the condition would be a voltage deviation with respect to a ground reference or a reversed polarity condition. If the condition is not satisfied, routine 300 ends at step 316. If the condition is satisfied, a battery voltage power supply amplifier is disconnected from the tip ring pair at step 306. After the battery voltage has been disconnected at step 304, measurement is made of any voltage present on the tip ring pair at step 308. If there is a voltage detected, the measured voltage is compared to a threshold voltage at step 310. If the voltage measured is less than the threshold value, the power supply amplifier is turned back on at step 312. However, if the voltage does exceed the threshold, an alarm signal is generated at step 314 before routine 300 ends at step 316.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

We claim:

1. A method for providing an alarm that more than one source is impressing a battery voltage onto a tip-ring pair wiring system when a telephony-over-data network device is used for providing telephony services, comprising:
   disconnecting a first supply circuit for providing battery voltage to the tip-ring system, the first supply circuit being associated with the network device;
   measuring the voltage on the tip-ring system while the first supply is disconnected from the tip-ring system; and
   generating an alarm signal if voltage is detected on the tip-ring system.

2. The method of claim 1 wherein the alarm signal is generated if the measured voltage is above a predetermined threshold.

3. The method of claim 1 further comprising, before disconnecting the first supply from the tip-ring pair, generating an imbalance signal if the voltage on said tip-ring system is not a steady voltage within a predetermined range.

4. The method of claim 1 further comprising indicating on a user interface that an alarm signal has been generated.

5. The method of claim 4 wherein the user interface is an LED.

6. The method of claim 4 wherein the user interface is a web page.

7. The method of claim 4 wherein the user interface is located at a head end.

* * * * *